United States Patent
Sorgius

(10) Patent No.: US 8,179,436 B2
(45) Date of Patent: *May 15, 2012

(54) METHOD AND DEVICE FOR SCANNING A DOCUMENT BY MEANS OF A LINE CAMERA

(75) Inventor: Helmut Sorgius, Constance (DE)

(73) Assignee: Chromasens GmbH, Constance (DE)

( * ) Notice: Subject to any disclaimer, the term of this patent is extended or adjusted under 35 U.S.C. 154(b) by 1317 days.

This patent is subject to a terminal disclaimer.

(21) Appl. No.: 11/834,193

(22) Filed: Aug. 6, 2007

(65) Prior Publication Data

US 2008/0030576 A1 Feb. 7, 2008

(30) Foreign Application Priority Data

Aug. 7, 2006 (DE) .......................... 10 2006 036 845

(51) Int. Cl.
*H04N 7/18* (2006.01)
*H04N 1/04* (2006.01)

(52) U.S. Cl. ....................................... 348/142; 358/474

(58) Field of Classification Search .................. 348/142; 358/474, 505, 518
See application file for complete search history.

(56) References Cited

U.S. PATENT DOCUMENTS 6,069,717 A 5/2000 Sato et al.
7,564,597 B2 * 7/2009 Chueh ............................ 358/474
7,986,446 B2 * 7/2011 Sorgius .......................... 358/474
2002/0113194 A1 * 8/2002 Hu et al. ..................... 250/208.1
2003/0025953 A1 * 2/2003 Chang et al. .................. 358/518

OTHER PUBLICATIONS

Patent Abstracts of Japan, Publication No. 06022159A, published on Jan. 28, 1994, applicant: Minolta Camera Co Ltd.
Patent Abstracts of Japan, Publication No. 08088778A, published on Apr. 2, 1996, applicant: Olympus Optical Co Ltd.

* cited by examiner

*Primary Examiner* — Larry Donaghue
(74) *Attorney, Agent, or Firm* — Houston Eliseeva LLP

(57) ABSTRACT

The invention relates to a method and a device for the scanning of a document by means of a line camera which has several scan lines and therefore generates several images independent of one another. Due to the spacing of the separate scan lines, these images are offset relative to one another. This offset also depends on the speed at which the line camera is moved relative to the document. According to the invention the separate images are brought into congruence by being shifted towards one another according to the whole-number content of Z, with at least one of the images being interpolated into the other image in accordance with the decimal place content of Z. The method according to the invention may be used to scan a document at a freely selectable scanning speed. The device according to the invention may be inserted as a module in an existing scanner.

18 Claims, 3 Drawing Sheets

METHOD AND DEVICE FOR SCANNING A DOCUMENT BY MEANS OF A LINE CAMERA

Figure 1:
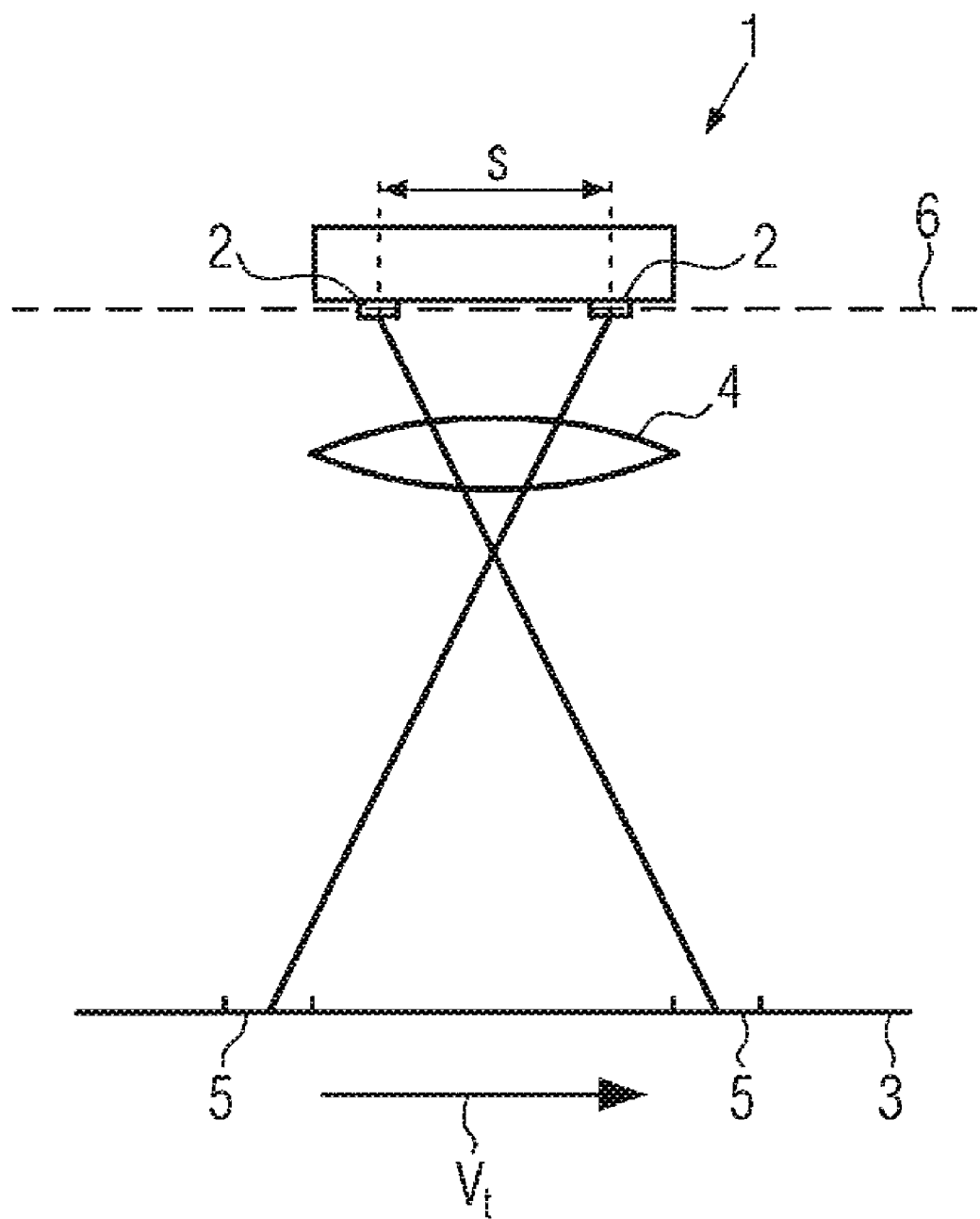

The invention relates to a method and a device for the scanning of a document by means of a line camera.

Line cameras are generally used for the optical scanning of a document in a scanner. The line camera and the document are moved relative to one another, so that the surface of the document to be scanned is covered completely by the line camera.

Such line cameras often have several scan lines. Each scan line is formed by one line sensor, generally comprised of a CCD. For colour scanning, line cameras with three scan lines are often used, in which case each scan line is provided with a different colour filter. Typically, colour filters for the three primary colours red, green and blue are provided. There are however also other line cameras which have for example only two scan lines. For example there is a known line camera with two scan lines, in which one scan line has a green colour filter, and the individual sensor elements of the other scan lines are provided alternately with blue and red colour filters.

The individual scan lines of a line camera are arranged parallel to one another and have a certain spacing. Each scan line generates a separate image of the document. The separate images are combined to form an overall image, wherein the misalignment of the images due to the spatial offset of the individual scan lines is compensated for by shifting the separate images towards one another, so that the image points of the images taken from the same point of the document are superimposed on one another.

In known methods for the scanning of a document, the speed at which the document is moved relative to the line camera is so geared to the offset of the of the scan lines that the separate images generated by the scan lines are offset relative to one another by a whole number of lines, so that through shifting the images by a certain number of lines, the separate images are brought into congruence. In practice, the lines recorded by the camera module further in advance in the direction of movement are placed in buffer memory and superimposed by the camera module after a certain interval of time on the lines following in the direction of movement, so that it is not necessary to handle and shift all of the separate images.

So that the camera module will output a correct overall image it is necessary for the speed of movement of the camera relative to the document to be geared to the offset of the scan lines. It is therefore possible to move the camera at only a few predetermined speeds relative to the document.

If it is desired to vary the speed of movement freely, then other methods must be used.

In many applications one would like to have the choice between high resolution with low throughput and low resolution with high throughput. There are scanning devices and scanning systems which allow such an adjustment of resolution and throughput. With known devices, however, it is possible to vary resolution and throughput only in specific steps. Intermediate steps are not possible, since they would impair the quality of the image generated.

The invention is based on the problem of creating a method and a device for the scanning of a document using a line camera with at least two parallel scan lines, in which the relative speed between the line camera and the document to be scanned is freely selectable and an overall image of high quality may be obtained in a simple manner.

The problem is solved by a method and by a device. Advantageous developments of the invention are disclosed in the respective dependent claims.

In the method according to the invention for the scanning of a document, a line camera is used which has at least two parallel scan lines arranged at a distance s from one another, and a lens with an imaging scale M. The method comprises the following steps:

line-by-line scanning of the document by the line camera, wherein by means of each scan line a separate image of the document is generated, with the images being offset from one another by the distance s between the scan lines, and the images being divided into a multiplicity of lines, wherein the distance D between two adjacent lines of an image in the image plane of the line camera is $$D = \frac{v_t \cdot t_z}{M}$$

wherein $v_t$ is the speed at which the line camera is moved relative to the object, and $t_z$ the interval of time between two consecutive exposures by one of the scan lines, so that an offset Z of the two images in the unit of line spacing D is $Z=s/D$ bringing into congruence of the two images by
shifting at least one of the images relative to the other image by Int(Z) lines to reduce the offset, and
interpolation of one of the images at lines offset by (Z−Int(Z)).

The device for implementing the method for the scanning of a document comprises a line camera with at least two scan lines arranged at a distance d from one another and a lens with an imaging scale M, a unit for delaying image lines of a specific image generated by a particular scan line by a whole-number portion of the offset Z of the two images, and a unit for the interpolation of the image lines of one of the images by the decimal place content of the offset Z.

In the method according to the invention, the relative speed at which the line camera is moved relative to the document is freely selectable. This results in displacement between the images generated by the individual scan lines, which does not correspond to any whole-number line offset. The method according to the invention involves a two-step process of bringing the two images into congruence. In the first step the images are shifted in accordance with the whole-number content of the offset Z. In the second step an interpolation is made by the decimal place content of the offset Z, so that image lines are generated in the images to be interpolated which coincide exactly with the image lines of the image with which they are brought into congruence.

In the preferred embodiment of the invention, the camera has more than two scan lines, each generating an image, with all images being brought into congruence in accordance with the method according to the invention. In a preferred development, one scan line is designed to detect the colour green, and the image generated by this scan line is not shifted, but the other images are shifted so as to coincide with the green image.

Figure 2:
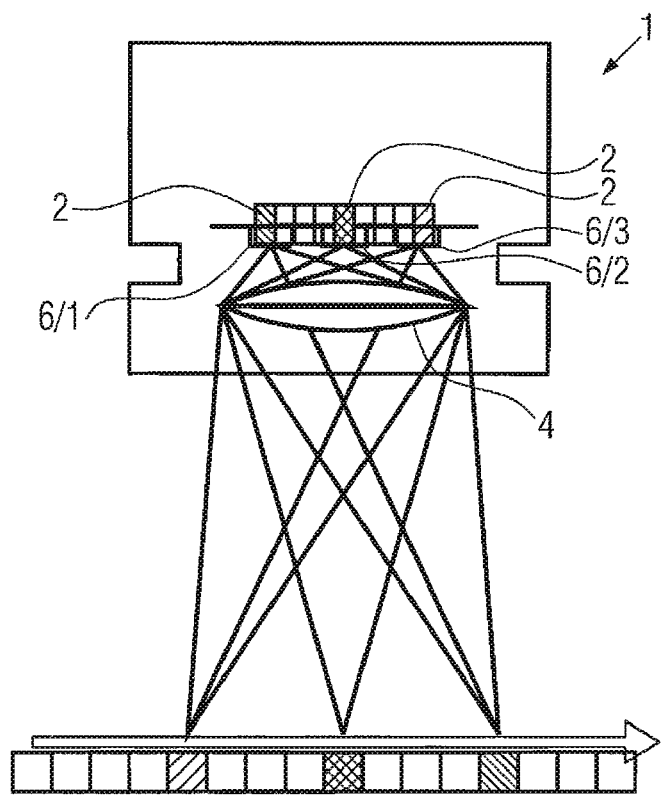
Figure 3:
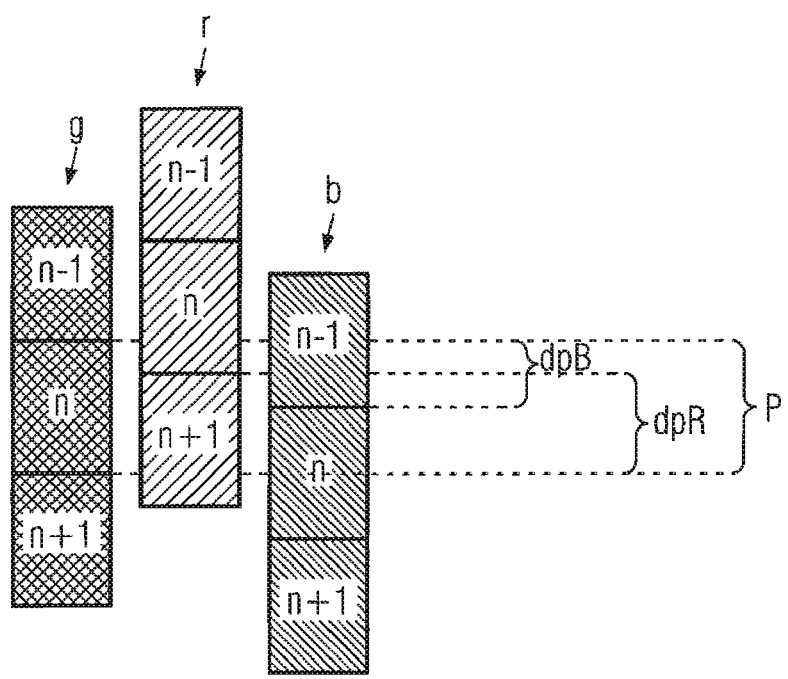
Figure 4:
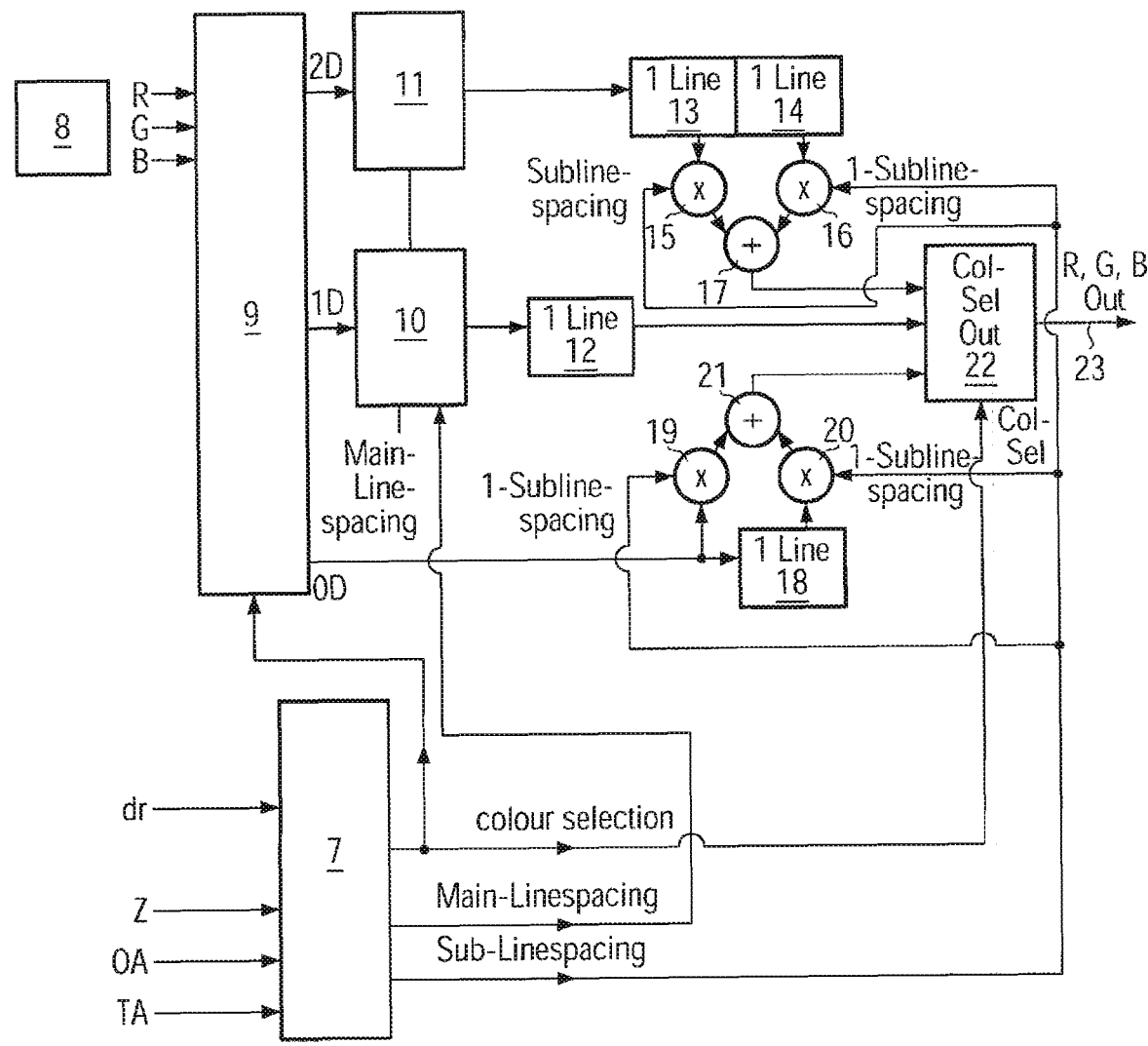

The invention is explained below by way of example, with the aid of the drawings, which show in:

FIG. 1 a schematic and simplified side view of a line camera with two scan lines for the scanning of a document FIG. 2 a schematic and simplified side view of a line camera with three scan lines for the scanning of a document FIG. 3 the offset of the image points of three different images after a first correction, and FIG. 4 a schematic block diagram of a device according to the invention.

In the method according to the invention for the scanning of a document, a line camera 1 is used which has at least two parallel scan lines 2 (FIG. 1). The scan lines are typically in the form of CCDs. Such CCDs have sensor elements, usually rectangular and arranged along a straight line, which are exposed simultaneously but read serially. The sensor elements and the scan lines 2 have an average spacing s.

An image of the document 3 is formed on the scan lines 2 of the line camera 1 by means of a lens 4. In FIG. 1 the lens is shown only as an individual lens. Naturally the lens may also comprise several lenses and if necessary reflectors and apertures. With the lens, in each case small areas 5 of the document 3 are imaged on, in each case, one sensor element of the scan lines 2. These small areas represent image points 5 of the document 3. The size of an image point 5 corresponds to the size of a sensor element of one of the scan lines 2 multiplied by the scale M of the lens 4.

In the present embodiment, the document 3 is moved past the line camera 1 at the speed of movement $v_t$ and is scanned at a predetermined scanning frequency, lying e.g. in the range 500 Hz to 50 KHz. There is therefore a period of time $t_z$, which is the inverse value of the scanning frequency, between two consecutive scanning processes. The greater the speed of movement $v_t$, the greater the spacing, in the direction of movement, of the individual image points in the image generated by the line camera 1. This means that the spacing of the lines of the generated images depends directly on the speed of movement and, at a constant line frequency of the camera, is directly proportional to the speed of movement. This spacing D of adjacent lines of an image is calculated in accordance with the following formula:

$$D = \frac{v_t \cdot t_z}{M}$$

wherein $v_t$ is the speed of movement, $t_z$ is the time between two consecutive exposures, and M is the imaging scale of the lens 4.

If the images generated by the line camera 1 are viewed in the image plane 6 of the line camera 1, i.e. the image points of the images have the dimensions of the individual sensor elements of the scan lines 2, then the spacing D between two adjacent lines of a particular image calculated by the above formula is applicable.

Since the two scan lines are exposed synchronously, the simultaneously generated image lines of the images generated by the two scan lines are offset relative to one another by the spacing s of the scan lines. As a result of this, the two images—viewed in the image plane 6 of the line camera 1—are offset relative to one another by the distance s. This offset Z may also be expressed in the unit of the line spacing D, giving Z=s/D. Z is a rational number with a whole-number content (integer) and a number of decimal places. Z is a scalar which applies to the two images generated by the two scan lines 2, independent of the view in the image plane 6.

The two images are brought into congruence by a two-step process. This involves the two images being displayed in the same coordinate system with the displacement caused by the offset of the scan lines of the line camera.

In the first process step, the two images are firstly shifted towards one another by the whole-number content of the offset Z, so that the displacement between the two images is minimised. The shift is therefore made against the offset. As a result, the two images are superimposed over one another in such a way that the image lines of the two images are offset from one another only by the decimal place content of Z, i.e. (Z−Int(Z)).

In principle it would also be possible, in the case of offset by decimal place content, to take the colour separation values of the nearest neighbour. The term colour separation value describes the intensity of a colour separation at an image point. The use of the colour separation value of the nearest neighbour would however lead to colour defects in the overall image thus generated. According to the invention therefore, instead of a further shift in one of the two images, new image lines are interpolated. These are offset by the decimal place content of Z from the former image lines. This interpolation is made by interpolating the line to be interpolated from the two image lines between which the scanning line to be interpolated is located. This involves interpolation of a colour separation value $f_i$ to be interpolated, from the colour separation values of the image points—aligned in the direction of movement—of the two adjacent image lines (ZE+, ZE−), wherein the colour separation value of the image point which is at a distance from the scanning line with the decimal place content of Z by the decimal place content of Z, and the colour separation value of the image point which is at a distance from the scanning line to be interpolated by one minus the decimal place content of Z, is weighted by one minus the decimal place content of Z. This gives rise to the following formula for the colour separation value $f_i$ to be interpolated:

$f_i = (Z-\text{Int}(Z)) \cdot f_{ZE+} + (1-(Z-\text{Int}(Z))) \cdot f_{ZE-}$

With this interpolation the image lines of one of the two images are offset in such a way that the image points contained therein are positioned at exactly the same spot as the corresponding image points of the other image.

These two images brought into congruence thus provide an overall image which has no colour defects on account of the bringing into congruence of the two images. This overall image may in principle be obtained with any desired speed of traverse of the line camera relative to the document to be scanned.

FIG. 2 shows an embodiment of a line camera 1 with three parallel scan lines 2. Since the line camera of FIG. 2 is of similar design to the line camera of FIG. 1, identical parts bear the same reference numbers.

The three scan lines 2 are each provided with a colour filter for the colour red 6/1, the colour green 6/2 and the colour blue 6/3. With these scan lines 2, a red, a green and a blue image of the document 3 is produced in each case. Such CCDs are obtainable e.g. from the NEC Corporation under the trade designations μPD3768 or μPD8821. These CCDs have respectively 7500 and 7300 sensor elements per scan line. In the μPD8821 CCD, the individual sensor elements are 10 μm (pitch width p) apart within a scan line, and the distance between two adjacent scan lines is 40 μm. The lens 4 is generally set, as far as possible, so that the document may be scanned by the line camera at 100 dpi, 150 dpi, 300 dpi or 600 dpi. This resolution in the line direction is subsequently described as the optical resolution. This optical resolution OA is as a rule clearly specified for a predetermined line camera with a predetermined lens.

The spacing s of adjacent scan lines 2 may also be represented as z=s/p, depending on the pitch width p of adjacent sensor elements of the scan lines. Usually z is a whole number. In the case of the NEC Corporation CCDs referred to above, z is in each case 4. The offset Z in units of the line spacing may also be calculated as follows:

$$Z = \frac{TA \cdot z}{OA},$$

wherein the relationship between offset and speed of movement in this formula is contained in the movement resolution TA according to the following formula:

$$TA = \frac{\text{Unit\_Length[1 inch]}}{v_t \cdot t_z}$$

In practice, the speed of movement is set so that a specific movement resolution is obtained. The optical resolution is in practice not variable. The offset Z may therefore be determined very easily from the movement resolution TA, the optical resolution OA and z.

The images generated by the line camera shown in FIG. 2 are preferably brought into congruence in such a way that the red image and the blue image are each shifted and interpolated in accordance with the process described above, so that they coincide with the green image. FIG. 3 shows in simplified form in each case three image points of three adjacent lines (n−1, n, n+1) of the colours green (g), red (r) and blue (b), which are essentially located in the line direction at the same point, and are shown offset to the side only for illustrative purposes. This illustration shows the image points after shifting by the whole-number content of the line spacing Z, so that the image points of the different colours are in each case still offset only by the decimal place content of Z.

The green image points remain unchanged. The red image points represented adjacent to the green image points are shifted by dpR, which corresponds to the decimal place content of Z. To obtain a red colour separation value for the position of the green image point of the line n, the two red image points of the lines n and n+1 are interpolated, wherein the image point of the line n+1 is weighted by the decimal place content of Z, and the colour separation value of the line n is weighted by one minus the decimal place content of Z.

The blue image points are shifted relative to the green image points by dpB against the direction of movement. In order to obtain a blue image point at the position of the green image point n, the colour separation values of the image points of lines n−1 and n are interpolated, with the colour separation value of the image point of the line n−1 being weighted by the decimal place content of Z, and the colour separation value of the image point of line n by one minus the decimal place content of Z.

Since the human eye is very much more receptive to the colour green than to the colours red and blue, it is expedient to leave the green image unchanged. As a result, the image will be perceived much more sharply by the human eye than if the red or blue image were to be left unchanged and the green image similarly interpolated.

FIG. 4 shows in simplified schematic form a block diagram of a device according to the invention for the scanning of a document using a line camera. This device is preferably part of a camera module. Besides this device, this camera module also has the CCD 8. The device itself is formed for example by an FPGA and additional memory modules.

Input at the input side of this device are the scanning direction (dr), the spacing z of adjacent scan lines depending on the pitch-width p, the optical resolution OA and the movement resolution TA. A control element 7 determines from these input values for a specific colour separation the whole-number content of the offset Z, which is described as the main line spacing, and the decimal place content of the offset Z, which is described as the sub line spacing.

The CCD 8 is connected to a colour selection switch 9 which receives from the CCD via an input the colour separation values of the various scan lines, and directs these to one of three outputs according to the colour selection and scanning direction dr prescribed by the control element 7. The outputs are designated 0D, 1D and 2D. By means of a delay unit 10, the output 1D is delayed by the whole-number content of the offset Z. The output 2D is connected to a further delay unit 11, which delays the corresponding signals by twice the whole-number content of the offset Z. The output 0D is not connected to any delay unit which would delay the signals by a whole-number content of Z. Applied to 0D are the signals which are read by the scan line scanning the document from the rear, in the direction of movement of the document. In the embodiment according to FIG. 2 this is the scan line 2 with the red colour filter 6/1. In the majority of CCDs, the scan line with the green colour filter is arranged in the middle, so that the green signals are generally applied to the output 1D. In the embodiment according to FIG. 2, the blue colour signals are applied to the output 2D. If the direction of scanning is rotated, then the signals at the outputs 0D and 2D are exchanged.

The delay unit of output 1D is followed by a buffer memory 12, in which at least a complete line may be stored temporarily. Due to the delay unit 10, the line put into temporary storage there is delayed by the whole-number content of Z.

The delay unit 11 is followed by two buffer memories 13, 14, each capable of storing temporarily a complete line. Each of the two buffer memories 13, 14 is used to store one of the image lines to be interpolated, with buffer memory 14 storing the first image line read out, i.e. the image line lying further back in the direction of movement, and buffer memory 13 storing the following image line. These buffer memories 13, 14 are each connected to multipliers 15, 16, with the colour separation values stored in buffer memory 13 being multiplied (weighted) by the decimal place content of Z, while the colour separation values stored in buffer memory 14 are multiplied by one minus the decimal place content of Z. Colour separation values weighted in this way are then added in an adder 17.

The output 0D is connected only to one buffer memory 18. In this buffer memory 18, first of all one image line is stored. The next image line scanned and its colour separation values are fed without buffering (output 0D) directly to a multiplier 19, which multiplies these colour separation values by one minus the decimal place content of Z (weighted). Simultaneously the colour separation value, corresponding in the line direction, of the image line stored temporarily in buffer memory 18 is multiplied at a further multiplier 20 by the decimal place content of Z. The two weighted colour separation values are then added at an adder 21. By this means an interpolated image point is obtained. The relevant image points 0D, 1D and 2D of the three colour separations are combined via a colour selection switch 22, with the three colour separation values R, G, B belonging to a common image point. The image points comprising in each case the three colour separation values are then output at an output 23.

This device permits an output in real time of the image lines brought completely into congruence, with the only input parameters required being the local resolution, the movement resolution, the number z inherent in the CCD, and the direction of scanning. The movement resolution is dependent on the scanning speed, i.e. different scanning speeds are possible, with suitable adjustment of the movement resolution.

This device may be installed as a sensor module in existing scanners and, through the use of this module, it is possible to operate an existing scanner at different scanning speeds, in particular freely selectable.

In the device shown in FIG. 4, the delay units 10, 11 are in the form of memory elements which are preferably able to store several image lines temporarily. The delay unit 11 for delay by twice the whole-number content of Z is able to provide buffer storage for at least 8 and preferably at least 10 or 15 image lines since, with a movement resolution corresponding to the optical resolution and with conventional CCDs, a delay of eight image lines is necessary. This device is preferably in the form of a FPGA, while the CCD and the two delay units 10, 11 are separate from the FPGA.

The buffer memories 12, 13, 14 may be realised in the separate memory elements of the delay units 10, 11 or in the FPGA. In principle it is also possible to provide all memory elements 10-14 in the FPGA.

In the above embodiments, in each case the image lines of a specific image are shifted by the whole-number content of Z and then interpolated. Within the scope of the invention it is of course also possible that one of two images which should be aligned with one another is first shifted by a whole-number content of Z, and the other image is interpolated in accordance with the decimal place content of Z.

The invention may be summarised briefly as follows:

The invention relates to a method and a device for the scanning of a document using a line camera which has several scan lines and therefore generates several images independent of one another. On account of the spacing of the separate scan lines, these images are offset from one another. This offset also depends on the speed at which the line camera is moved relative to the document. According to the invention the individual images are brought into congruence by being shifted towards one another by the whole-number content of Z, and by at least one of the images being interpolated in the other image by the decimal place content of Z.

With the method according to the invention, a document may be scanned at a freely selectable scanning speed. The device according to the invention may be inserted as a module in an existing scanning device.

LIST OF REFERENCE NUMBERS 1 line camera
2 scan line
3 document
4 lens
5 image point
6 image plane
6/1-6/3 colour filter
7 control element
8 CCD
9 colour selection switch
10 delay unit
11 delay unit
12 buffer memory
13 buffer memory
14 buffer memory
15 multiplier
16 multiplier
17 adder
18 buffer memory
19 multiplier
20 multiplier
21 adder
22 colour selection switch
23 output

The invention claimed is:

1. Method for the scanning of a document by means of a line camera wherein the line camera has at least two parallel scan lines arranged at a distance s from one another, and a lens with an imaging scale M, comprising the following steps:
line-by-line scanning of the document by the line camera, wherein by means of each scan line a separate image of the document is generated, with the images being offset from one another by the distance s between the scan lines, and the images being divided into a multiplicity of lines, wherein the distance D between two adjacent lines of an image in the image plane of the line camera is $$D = \frac{v_t \cdot t_z}{M}$$

wherein $v_t$ is the speed at which the line camera is moved relative to the object, and $t_z$ the interval of time between two consecutive exposures by one of the scan lines, so that an offset Z of the two images in the unit of line spacing D is Z=s/D
bringing into congruence the two images by
shifting at least one of the images relative to the other image by Int(Z) lines to reduce the offset, and
interpolation of one of the images at lines offset by (Z−Int(Z)).

2. Method according to claim 1 wherein the line camera has more than two scan lines, each of which generates an image, wherein all images are brought into congruence by the method according to claim 1.

3. Method according to claim 1 wherein the scan lines are designed to detect different colors.

4. Method according to claim 2 wherein the scan lines are designed to detect different colors.

5. Method according to claim 3 wherein one of the scan lines is designed to detect a specific color, and the images generated by the other scan lines are interpolated so as to be brought into congruence with the image of the specific color.

6. Method according to claim 4 wherein one of the scan lines is designed to detect a specific color, and the images generated by the other scan lines are interpolated so as to be brought into congruence with the image of the specific color.

7. Method according to claim 5 wherein the specific color is green.

8. Method according to claim 6 wherein the specific color is green.

9. Method according to claim 1 wherein in each case of interpolation, two color separation values of adjacent image lines are interpolated together, with one of the two color separation values being weighted with the decimal place content of Z and the other color separation value being weighted with one minus the decimal place content of Z.

10. Method according to claim 8 wherein in each case of interpolation, two color separation values of adjacent image lines are interpolated together, with one of the two color separation values being weighted with the decimal place content of Z and the other color separation value being weighted with one minus the decimal place content of Z.

11. Method according to claim 1 wherein the method is executed line-by-line, i.e. when in each case one or two image lines of each image are generated, they are brought into congruence with the corresponding image lines of the other images.

12. Method according to claim 10 wherein the method is executed line-by-line, i.e. when in each case one or two image lines of each image are generated, they are brought into congruence with the corresponding image lines of the other images.

13. Method according to claim 1 wherein the offset Z is calculated on the basis of an optical resolution of the system comprising line camera and lens in the line direction, a movement resolution which depends on the speed with which the line camera is moved relative to the object, and a number z which indicates the spacing of two adjacent scan lines of the line camera in units of the pitch-width of adjacent sensor elements of a scan line.

14. Method according to claim 12 wherein the offset Z is calculated on the basis of an optical resolution of the system comprising line camera and lens in the line direction, a movement resolution which depends on the speed with which the line camera is moved relative to the object, and a number z which indicates the spacing of two adjacent scan lines of the line camera in.

15. Device for scanning a document comprising a line camera with at least two scan lines arranged at a distance d from one another, and a lens with an imaging scale M a unit for delaying image lines of a specific image generated by a particular scan line by a whole-number portion of the offset Z of the two images, and a control unit for carrying out automatically the following steps:

a unit for the interpolation of the image lines of one of the images by the decimal place content of the offset Z and a control unit for carrying our automatically the following steps: line-by-line scanning of the document by the line camera, wherein by means of each scan line a separate image of the document is generated, with the images being offset from one another by the distance s between the scan lines, and the images being divided into a multiplicity of lines, wherein the distance D between two adjacent lines of an image in the image plane of the line camera is $$D = \frac{v_t \cdot t_z}{M}$$

wherein $v_t$ is the speed at which the line camera is moved relative to the object, and $t_z$ the interval of time between two consecutive exposures by one of the scan lines, so that an offset Z of the two images in the unit of line spacing D is Z=s/D bringing into congruence of the two images by
shifting at least one of the images relative to the other image by Int(Z) lines to reduce the offset, and
interpolation of one of the images at lines offset by (Z−Int(Z)).

16. Device according to claim 15, wherein the unit for delaying the image 2 lines by a whole-number portion of Z is in the form of a memory device.

17. Device according to claim 15, wherein the unit for interpolation has at least one buffer memory, two multipliers and an adder.

18. Device according to claim 16, wherein the unit for interpolation has at least one buffer memory, two multipliers and an adder.

* * * * *